(12) United States Patent
Alkov et al.

(10) Patent No.: US 9,430,118 B2
(45) Date of Patent: Aug. 30, 2016

(54) SPATIALLY-ORIENTED TRAVERSAL ANIMATIONS FOR NETWORK ADDRESS TRANSITIONS

(75) Inventors: Christopher S. Alkov, Austin, TX (US); Denise A. Bell, Austin, TX (US); Brian Farrell, Austin, TX (US); Travis M. Grigsby, Austin, TX (US); Jana H. Jenkins, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 1133 days.

(21) Appl. No.: 13/089,812

(22) Filed: Apr. 19, 2011

(65) Prior Publication Data

US 2012/0272166 A1 Oct. 25, 2012

(51) Int. Cl.
G06F 3/00 (2006.01)
G06F 3/0481 (2013.01)
G06F 17/30 (2006.01)
G06F 3/048 (2013.01)

(52) U.S. Cl.
CPC ..... *G06F 3/04815* (2013.01); *G06F 17/30873* (2013.01); *G06F 2203/04806* (2013.01)

(58) Field of Classification Search
CPC ....................... G06F 3/0481–3/0489
See application file for complete search history.

(56) References Cited

U.S. PATENT DOCUMENTS

| | | | | |
|---|---|---|---|---|
| 5,680,561 A * | 10/1997 | Amro et al. | | 715/787 |
| 5,854,630 A * | 12/1998 | Nielsen | | 715/739 |
| 5,977,972 A * | 11/1999 | Bates et al. | | 715/786 |
| 6,025,844 A * | 2/2000 | Parsons | | 715/805 |
| 6,035,330 A * | 3/2000 | Astiz et al. | | 709/218 |
| 6,072,490 A * | 6/2000 | Bates et al. | | 715/821 |
| 6,144,962 A * | 11/2000 | Weinberg et al. | | |
| 6,182,072 B1 * | 1/2001 | Leak et al. | | |
| 6,188,405 B1 * | 2/2001 | Czerwinski et al. | | 715/764 |
| 6,189,024 B1 * | 2/2001 | Bauersfeld et al. | | 709/203 |
| 6,226,655 B1 * | 5/2001 | Borman et al. | | 715/207 |
| 6,243,091 B1 * | 6/2001 | Berstis | | 715/839 |
| 6,271,840 B1 * | 8/2001 | Finseth et al. | | 715/236 |
| 6,313,835 B1 * | 11/2001 | Gever et al. | | 715/846 |
| 6,331,861 B1 * | 12/2001 | Gever et al. | | 345/629 |
| 6,404,446 B1 * | 6/2002 | Bates et al. | | 715/854 |
| 6,496,208 B1 * | 12/2002 | Bernhardt et al. | | 715/853 |

(Continued)

OTHER PUBLICATIONS

Bederson, Ben et. al. "A zooming web browser"; Feb. 25, 1998 pp. 1-12.*

(Continued)

*Primary Examiner* — Steven B Theriault
(74) *Attorney, Agent, or Firm* — DeLizio Law, PLLC (57) ABSTRACT

Embodiments include a method that includes receiving a destination Internet address for a destination web page into a graphical web browser that is displaying a current web page having a current Internet address on a display. The method includes determining a relationship between the destination Internet address and the current Internet address. The relationship is determined by determining differences between the current Internet address and the destination Internet address. The method also includes determining a spatially-oriented traversal animation based, at least in part, on the relationship between the destination Internet address and the current Internet address. The method includes animating bringing the destination web page onto the display using the spatially-oriented traversal animation. The method also includes displaying the destination web page after the spatially-oriented traversal animation.

20 Claims, 8 Drawing Sheets

(56) References Cited

U.S. PATENT DOCUMENTS

| | | | |
|---|---|---|---|
| 6,526,424 B2* | 2/2003 | Kanno et al. | 715/229 |
| 6,572,662 B2* | 6/2003 | Manohar et al. | 715/273 |
| 6,585,776 B1* | 7/2003 | Bates et al. | 715/206 |
| 6,667,751 B1* | 12/2003 | Wynn et al. | 715/833 |
| 6,853,391 B2* | 2/2005 | Bates et al. | 715/854 |
| 7,047,502 B2* | 5/2006 | Petropoulos et al. | 715/781 |
| 7,134,089 B2* | 11/2006 | Celik et al. | 715/767 |
| 7,159,188 B2* | 1/2007 | Stabb et al. | 715/787 |
| 7,162,493 B2* | 1/2007 | Weiss et al. | |
| 7,219,300 B2* | 5/2007 | Arquie | H04L 41/12 709/224 |
| 7,225,407 B2* | 5/2007 | Sommerer et al. | 715/738 |
| 7,346,855 B2* | 3/2008 | Hellyar et al. | 715/783 |
| 7,506,268 B2 | 3/2009 | Jennings et al. | |
| 7,568,168 B2* | 7/2009 | Beezer et al. | 715/802 |
| 7,617,458 B1* | 11/2009 | Wassom et al. | 715/760 |
| 7,681,131 B1* | 3/2010 | Quarterman | H04L 41/22 709/224 |
| 7,716,569 B2* | 5/2010 | Ran et al. | 715/207 |
| 7,814,425 B1* | 10/2010 | O'Shaugnessy et al. | 715/752 |
| 7,908,282 B2* | 3/2011 | Naick et al. | 707/752 |
| 7,962,843 B2* | 6/2011 | Milic-Frayling et al. | 715/206 |
| 8,010,900 B2* | 8/2011 | Hart et al. | 715/747 |
| 8,015,501 B2* | 9/2011 | Conrad et al. | 715/783 |
| 8,037,527 B2* | 10/2011 | Milener et al. | 726/22 |
| 8,205,172 B2* | 6/2012 | Wong et al. | 715/855 |
| 8,230,334 B2* | 7/2012 | Park et al. | 715/252 |
| 8,230,359 B2* | 7/2012 | Robertson et al. | 715/801 |
| 8,239,456 B2* | 8/2012 | Le Roy et al. | 709/204 |
| 8,250,491 B2* | 8/2012 | Holmes | 715/853 |
| 8,271,898 B1* | 9/2012 | Mattos et al. | 715/784 |
| 8,316,306 B2* | 11/2012 | Audet | 715/736 |
| 8,392,470 B2* | 3/2013 | Han et al. | 707/802 |
| 8,479,115 B2* | 7/2013 | Mattos et al. | 715/784 |
| 8,533,580 B1* | 9/2013 | Xu | G06F 3/04815 715/205 |
| 2002/0033850 A1* | 3/2002 | Bates et al. | 345/853 |
| 2003/0080990 A1* | 5/2003 | Lyness | 345/713 |
| 2004/0003351 A1* | 1/2004 | Sommerer et al. | 715/517 |
| 2004/0030741 A1* | 2/2004 | Wolton et al. | 709/202 |
| 2004/0080531 A1* | 4/2004 | Berstis | 345/738 |
| 2004/0205514 A1* | 10/2004 | Sommerer et al. | 715/501.1 |
| 2004/0218894 A1* | 11/2004 | Harville et al. | 386/46 |
| 2004/0250219 A1* | 12/2004 | Sawada | 715/853 |
| 2005/0033577 A1* | 2/2005 | Bradley et al. | 704/270.1 |
| 2005/0114782 A1* | 5/2005 | Klinger | 715/742 |
| 2005/0131924 A1* | 6/2005 | Jones | 707/100 |
| 2007/0094267 A1* | 4/2007 | Good et al. | 707/10 |
| 2008/0034328 A1* | 2/2008 | Cahill et al. | 715/855 |

OTHER PUBLICATIONS

SilverLightShow.net "Animations between web pages" 2010.*
Miroslavov, Miro "Animated Navigation Between Pages", www.silverlightshow.com, Articles, Jun. 8, 2010 Obtained from Internet: http://www.silverlightshow.net/items/Animated-navigation-between-Pages.aspx 2007, 10 pages.

* cited by examiner

SPATIALLY-ORIENTED TRAVERSAL ANIMATIONS FOR NETWORK ADDRESS TRANSITIONS

BACKGROUND

Embodiments of the inventive subject matter generally relate to the field of computers, and, more particularly, to spatially-oriented traversal animations for network address transitions. Internet browsing across a number of related and unrelated websites and webpages can be a muddled, frenetic experience that includes hopping around to many different locations on the Internet.

SUMMARY

Embodiments include a method that includes receiving a destination Internet address for a destination web page into a graphical web browser that is displaying a current web page having a current Internet address on a display. The method includes determining a relationship between the destination Internet address and the current Internet address. The relationship is determined by determining differences between the current Internet address and the destination Internet address. The method also includes determining a spatially-oriented traversal animation based, at least in part, on the relationship between the destination Internet address and the current Internet address. The method includes animating bringing the destination web page onto the display using the spatially-oriented traversal animation. The method also includes displaying the destination web page after the spatially-oriented traversal animation.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

The description that follows includes exemplary systems, methods, techniques, instruction sequences and computer program products that embody techniques of the present inventive subject matter. However, it is understood that the described embodiments may be practiced without these specific details. For instance, although examples refer to the Uniform Resource Language (URL) addressing for the Internet, some example embodiments can use any other type of addressing and in any other types of networks. In other instances, well-known instruction instances, protocols, structures and techniques have not been shown in detail in order not to obfuscate the description.

Some example embodiments determine a destination Internet address for a web page to be displayed and then use different types of traversal animations to bring a web page onto a display based on the destination Internet address. In some example embodiments, changes between a current Internet address and a destination Internet address are used to determine a type of traversal animation to bring a web page at the destination Internet address onto the display.

For example, a current Internet address of a current web page being displayed is determined. A destination Internet address is then received for display of a new web page (i.e., a destination web page). In particular, a destination Internet address can be received in response to a user selecting a link on the current web page, a user manually typing in the destination Internet address, etc. In response, a spatially-oriented traversal animation is determined to bring the destination web page onto the display. For example, assume the current web page is at the current Internet web address—"http://www.example.com". Assume that the user selects a drill-down resource link on the current web page—"http://www.example.com/item/43". In this example, the new link appends a path to the current Internet web address. Accordingly, a zoom in animation is selected as the spatially-oriented traversal animation. The zoom in animation is shown prior to the display of the destination web page. Now assume that the user returns to the previous web page—"http://www.example.com". For example, the user can select a link on the web page; select a back button in the control area of the window that is displaying the web page, etc. Accordingly, a zoom out animation is selected as the spatially-oriented traversal animation because the user is backing out from the web page.

A first example of the type of changes to a web address (current web address to destination web address) that provides a traversal animation includes a drill down change. For example, the web address change can include an addition of path information to a given domain web address (e.g., current web address—"x/index.html"→destination web address—"x/path1/ . . . /pathn/something.html"). In another example of a drill down change, the web address change can include an addition of more path to a web address (e.g., current web address—"x/path1/something.html"→destination web address—"x/path1/path2/somethingelse.html").

A second example of the type of changes to a web address that provides a traversal animation includes a back out change. For example, the web address change can go from some part of a domain back to the home web address for the domain (e.g., destination home address—"x/index.html"). In another example of a back out change, the web address change can include a reduction of path information (e.g., current web address—"x/path1/path2/somethingelse.html"→destination web address—"x/path1/something.html"). Other examples of different types of changes to a web address and example animations that can be associated with these changes is described in more detail below.

Figure 1:
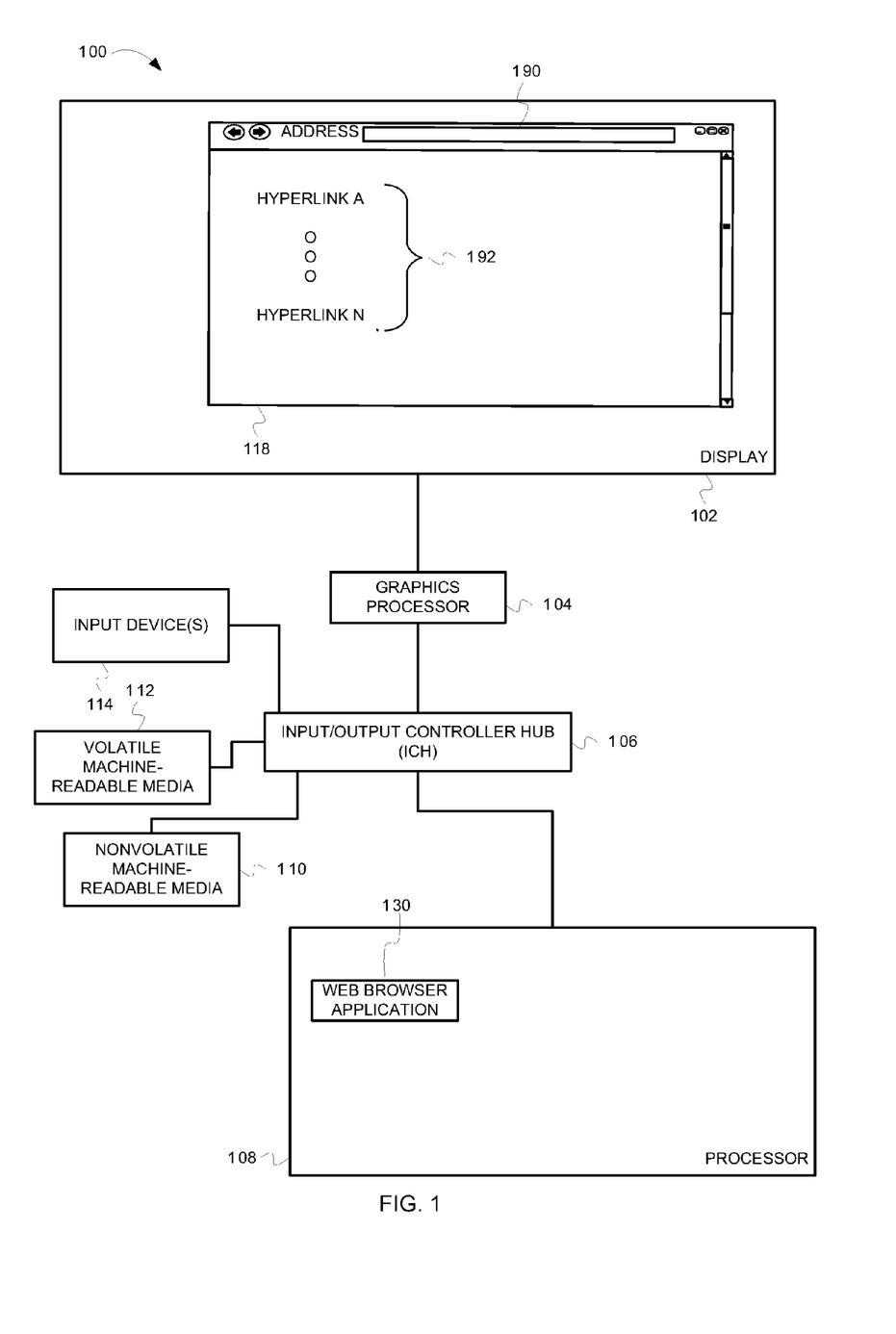
FIG. 1 depicts a conceptual diagram of a system to provide spatially-oriented traversal animations for network address transitions, according to some example embodiments.

FIG. 1 depicts a conceptual diagram of a system to provide spatially-oriented traversal animations for network address transitions, according to some example embodiments. FIG. 1 can represent any type of computing device (e.g., a desktop computer, laptop computer, mobile device, etc.). Also the components of FIG. 1 can be in a single device or distributed across two or more devices. FIG. 1 includes a system 100 that includes a display 102, a graphics processor 104, an input/output (I/O) controller hub 106, a processor 108, a nonvolatile machine-readable media 110, a volatile machine-readable media 112, and input device(s) 114.

The I/O controller hub 106 is communicatively coupled to the graphics processor 104, the input device(s) 114, the volatile machine-readable media 112, the nonvolatile machine-readable media 110, and the processor 108. The graphics processor 104 is communicatively coupled to the display 102. The processor 108 can be one processor or possibly multiple processors, multiple cores, multiple nodes, and/or implementing multi-threading, etc. The volatile machine-readable media 112 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. Although illustrated as being coupled to the I/O controller hub 106, the volatile machine-readable media 112 may be coupled to the processor 108. The nonvolatile machine-readable media 110 can include optical storage, magnetic storage, etc. The input device(s) 114 can include a keyboard, mouse, microphone, etc. The system 100 can include other components not shown in FIG. 1. For example, the system 100 can include a network interface (e.g., an ATM interface, an Ethernet interface, a Frame Relay interface, SONET interface, wireless interface, etc.)

The display 102 can include any number of windows. In this example, the display includes a window having an Internet web page 118. The Internet web page 118 includes an address bar area 190 that provides the current web address for the current Internet web page being displayed. A user can manually input a different web address, thereby causing the display of the Internet web page associated with the different web address. In this example, the Internet web page 118 also includes a number of hyperlinks 192. In response to a user selecting one of these hyperlinks, a different web page is displayed that is associated with the selected hyperlink. Although not shown, the Internet web page 118 can include one or more buttons, wherein in response to selecting one of these buttons, a different web page is displayed that is associated with the selected button. As further described below, in response to a network address transition (e.g., manual input of a different web address, selection of a hyperlink, selection of a button, etc.), a traversal animation is shown to provide a transition from the current Internet web page to the different Internet web page. Various examples of these different traversal animations are described below.

In this example, multiple applications are executing in the processor 108. This execution can be serial, parallel, or partially in parallel. For example, assume that the processor 108 comprises multiple processors. Then different applications can be executing in different processors in parallel or at least partially in parallel. In this example, the applications executing in the processor 108 include a web browser application 130 and a graphics manager 116. While these applications are described as being software executing in the processor 108, in some other example embodiments, these applications can be hardware or a combination of hardware and firmware. In particular, any one of the functionalities performed by these applications may be partially (or entirely) implemented in hardware and/or in the processor 108. For example, the functionality may be implemented with an application specific integrated circuit, in logic implemented in the processor 108, in a co-processor on a peripheral device or card, etc.

Execution of the web browser application 130 causes the display of the Internet web page 118 on the display 102. In particular, the processor 108 can send instructions to the graphics processor 104 through the I/O controller hub 106 to display the Internet web page 118 on the display 102. The execution of the web browser application 130 can be in response to a user request (e.g., a mouse selection of a graphical icon).

The web browser application 130 can be any type of application that provides the displaying of the Internet web page 118, the processing of the inputs by a user for the Internet web page 118, etc. The web browser application 130 can transmit control data to the graphics processor 104 through the I/O controller hub 106 for updating the display of the Internet web page 118. For example, the web browser application 130 can transmit instructions to the graphics processor 104 to display a different Internet web page in the window used for displaying the Internet web page 118, in a new window, etc. Such instructions can be in response to user input from one or more of the input devices 114 (e.g., keyboard input, mouse selection, etc.).

As further described below, in response to the displaying of a different Internet web page, the web browser application 130 causes the display of a traversal animation as part of the display of the different Internet web page. The web browser application 130 compares the current Internet address with the destination Internet address to display a spatially-oriented traversal animation, as part of the change from the current Internet web page to the destination Internet web page. Such embodiments provide a visual context as a user moves from one Internet web page to another Internet web page. Accordingly in some example embodiments, changes between a current Internet address and a destination Internet address are used to determine a type of traversal animation that the web browser application 130 uses to bring a web page at the destination Internet address onto the display 102. For example, assume the current web page is at the current Internet web address—"http://www.example.com". Assume that the user selects a drill-down resource link on the current web page—"http://www.example.com/item/43". In this example, the new link appends a path to the current Internet web address. Accordingly, a zoom in animation is selected as the spatially-oriented traversal animation. Now assume that the user returns to the previous web page—"http://www.example.com". For example, the user can select a link on the web page; select a back button in the control area of the window that is displaying the web page, etc. Accordingly, a zoom out animation is selected as the spatially-oriented traversal animation because the user is backing out from the web page. A number of different example screenshots of windows illustrating example traversal animations for network address transition are described in more detail below.

Figure 2:
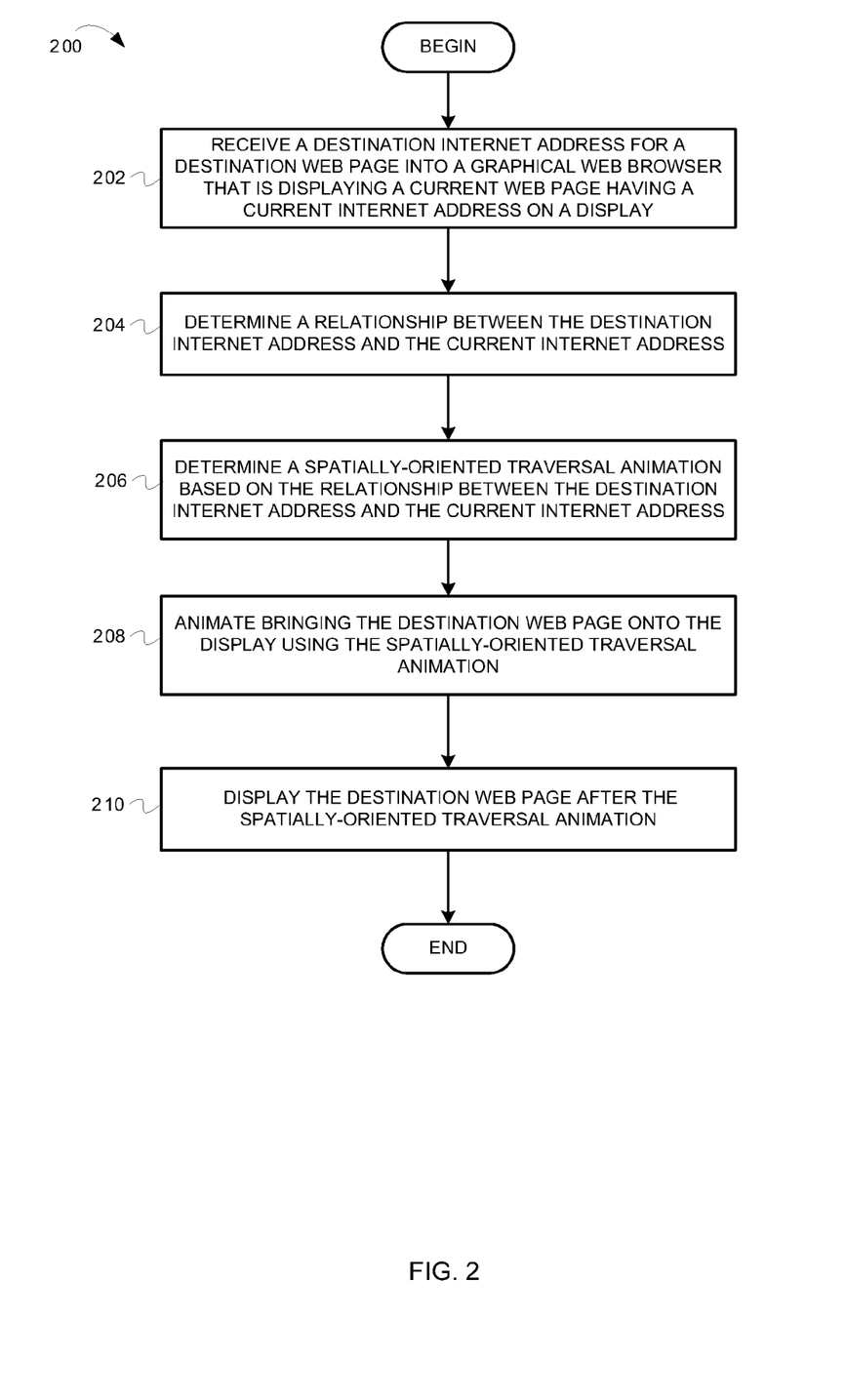
FIG. 2 depicts a flowchart to provide spatially-oriented traversal animations for network address transitions, according to some example embodiments.

A flowchart of operations, according to some example embodiments, is now described. In particular, FIG. 2 depicts a flowchart to provide spatially-oriented traversal animations for network address transitions, according to some example embodiments. The operations of the flowchart 200 are described with reference to FIG. 1. The operations of the flowchart 200 start at block 202.

At block 202, the web browser application 130 (illustrated in FIG. 1) receives a destination Internet address for a destination web page into a graphical web browser that is displaying a current web page having a current Internet address on a display. For example with reference to FIG. 1, assume that based on previous operations the web browser application 130 has instructed the graphics processor 104 to display the Internet web page 118 (the current Internet web page) on the display 102. Then, the web browser application 130 receives a different Internet address (the destination Internet address) for a different web page (the destination web page). For example, a user can select one of the hyperlinks 192 using one of the input devices 114 (e.g., a mouse). Such a selection causes the web browser application 130 to receive the destination Internet address. In another example, the user can manually input the destination Internet address through the address bar area 190 in the current Internet web page, a selection of a button in the current Internet web page, etc. The operations of the flowchart 200 continue at block 204.

At block 204, the web browser application 130 determining a relationship between the destination Internet address and the current Internet address. For example, the relationship can be a drill down change between the destination Internet address and the current Internet address. To illustrate, the web address change can include an addition of path information to a given domain web address. Below is an example:

current web address—"x/index.html"→destination web address—"x/path1/ . . . /pathn/something.html"

In another illustration of a drill down change, the web address change can include an addition of more path to a web address. Below is an example:

current web address—"x/path1/something.html"→destination web address—"x/path1/path2/somethingelse.html"

In another example, the relationship can be a back out change between the destination Internet address and the current Internet address. To illustrate, the web address change can go from some part of a domain back to the home web address for the domain (e.g., destination home address—"x/index.html"). In another illustration of a back out change, the web address change can include a reduction of path information. Below is an example:

current web address—"x/path1/path2/somethingelse.html"→destination web address—"x/path1/something.html").

In another example, the relationship can be change of intra-domain at a same path level (e.g., items of a same type) between the destination Internet address and the current Internet address. Below is an example current web address—"www.example.com/path1/path2/41"→destination web address—"www.example.com/path1/path2/45"

In another example, the relationship can be an inter-domain change between the destination Internet address and the current Internet address. Below is an example:

current web address—"www.example.com"→destination web address—"www.example2.com"

In another example, the relationship can be going from any location to a known search engine between the destination Internet address and the current Internet address. In another example, the relationship can be going from any location to a known major presence between the destination Internet address and the current Internet address. Examples of major presences can include a store, social new hub, open resource site, etc. Returning to the flowchart 200, the operations continue at block 206.

Figure 3:
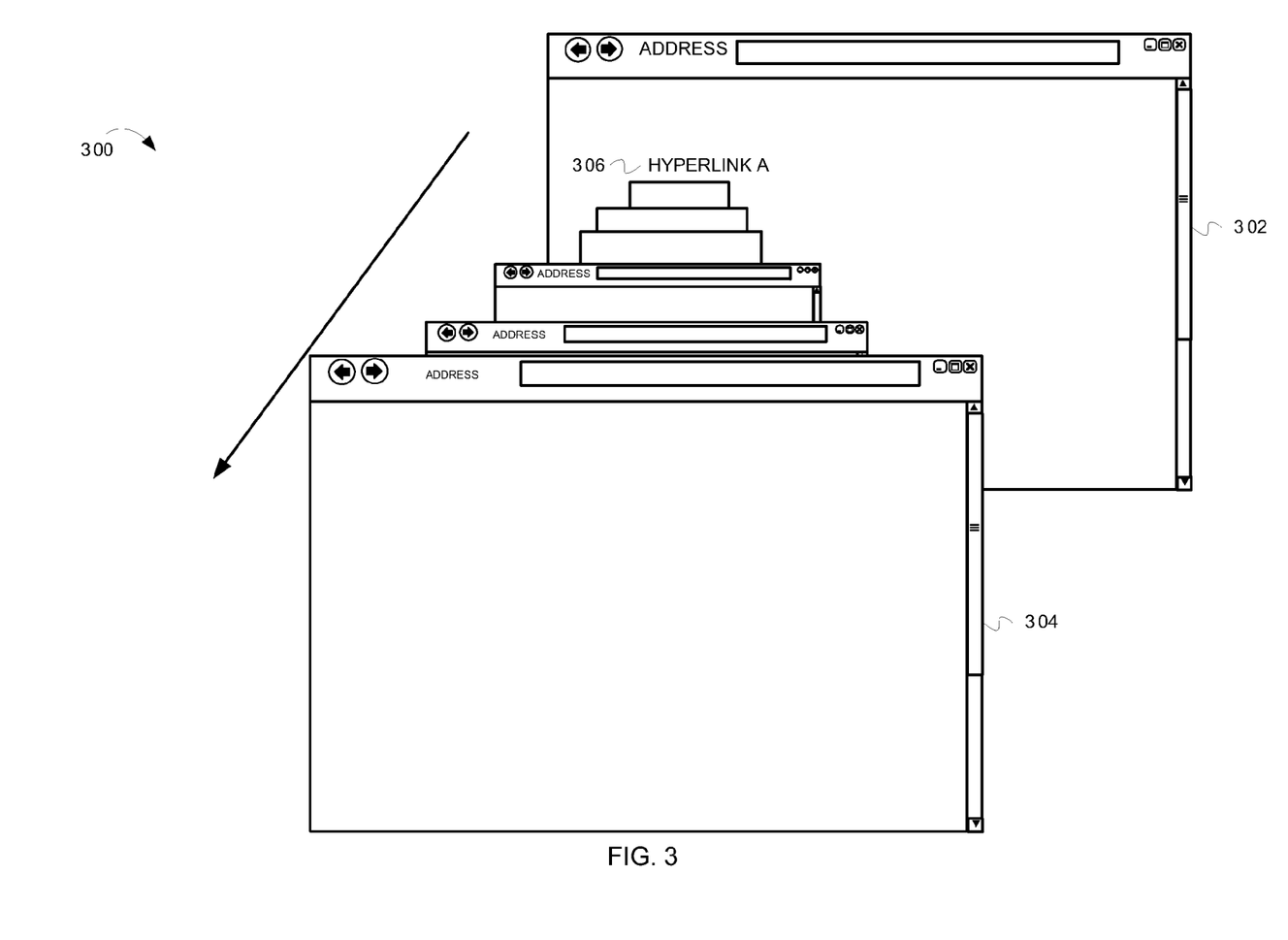
FIG. 3 depicts a spatially-oriented traversal zoom in animation, according to some example embodiments.

At block 206, the web browser application 130 determines a spatially-oriented traversal animation based on the relationship between the destination Internet address and the current Internet address. To help illustrate, FIGS. 3-8 depict some examples of spatially-oriented traversal animations, which are now described. FIG. 3 depicts a spatially-oriented traversal zoom in animation, according to some example embodiments. In particular, FIG. 3 depicts an animation 300 that includes a current Internet web page 302 and a destination Internet web page 304. As shown, the destination Internet web page 304 is animated as being zoomed in. In this example, a user has selected a hyperlink A 306. Accordingly, the zoom in animation begins at the location of the hyperlink A 306 and zooms in to the destination Internet web page 304.

Figure 4:
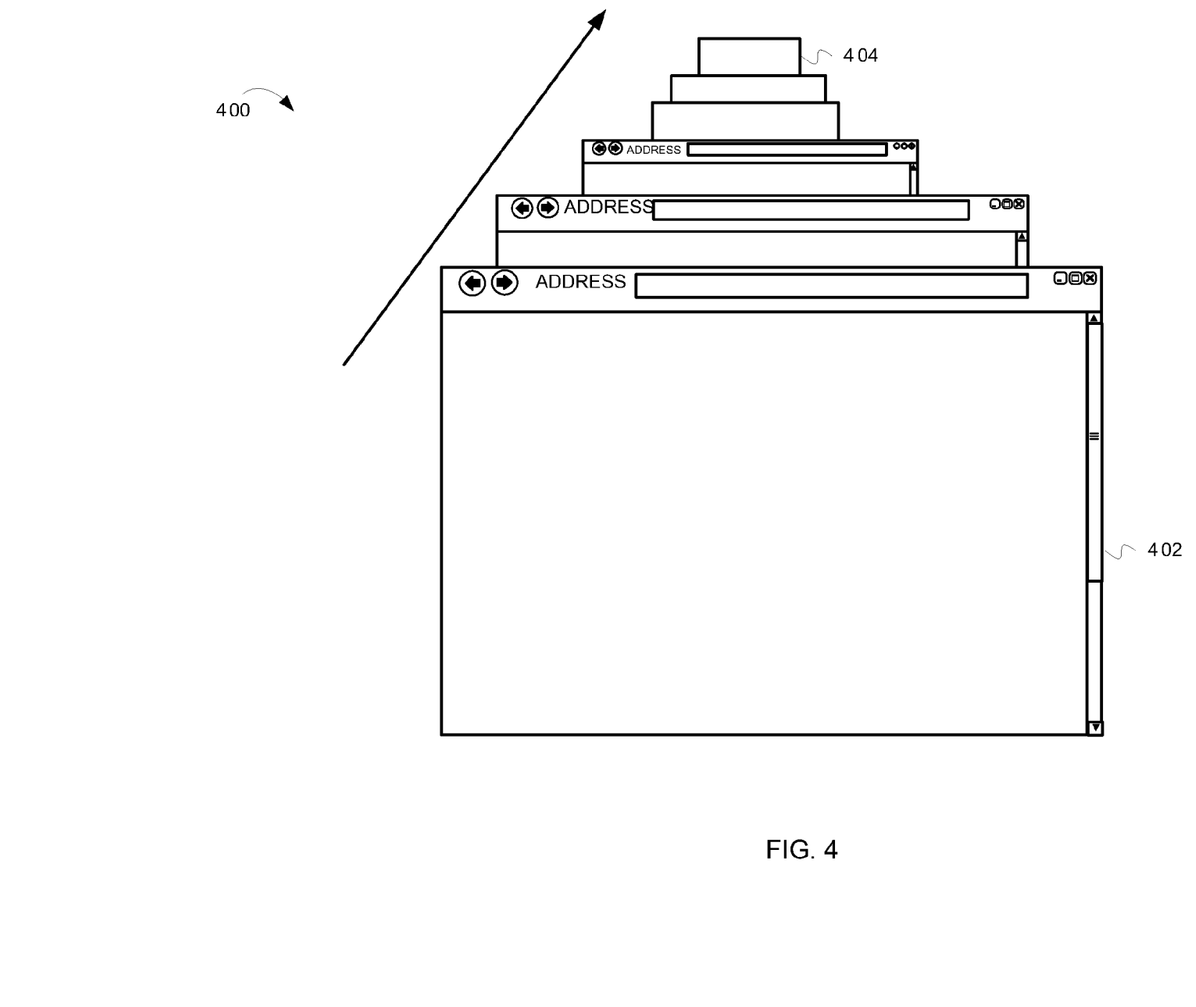
FIG. 4 depicts a spatially-oriented traversal zoom out animation, according to some example embodiments.

For another example, FIG. 4 depicts a spatially-oriented traversal zoom out animation, according to some example embodiments. In particular, FIG. 4 depicts an animation 400 that includes a current Internet web page 402 and a destination Internet web page 404. As shown, the animation 400 starts with the current Internet web page 402 and zooms out.

Figure 5:
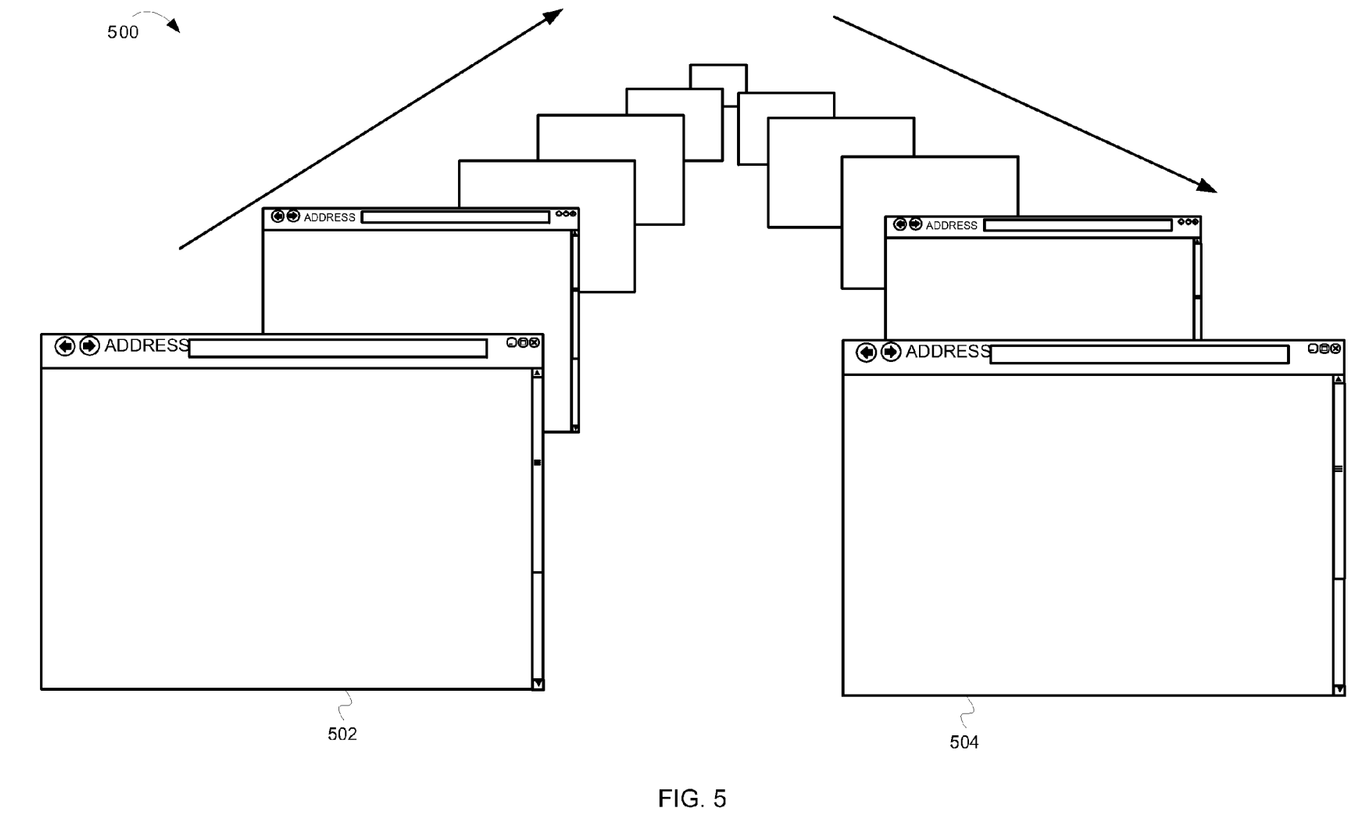
FIG. 5 depicts a spatially-oriented traversal zoom in, zoom out animation, according to some example embodiments.

FIG. 5 depicts a spatially-oriented traversal zoom in, zoom out animation, according to some example embodiments. In particular, FIG. 5 depicts an animation 500 that includes a current Internet web page 502 and a destination Internet web page 504. As shown, the animation 500 starts with the current Internet web page 502, zooms out and then zooms back in to the destination Internet web page 504.

Figure 6:
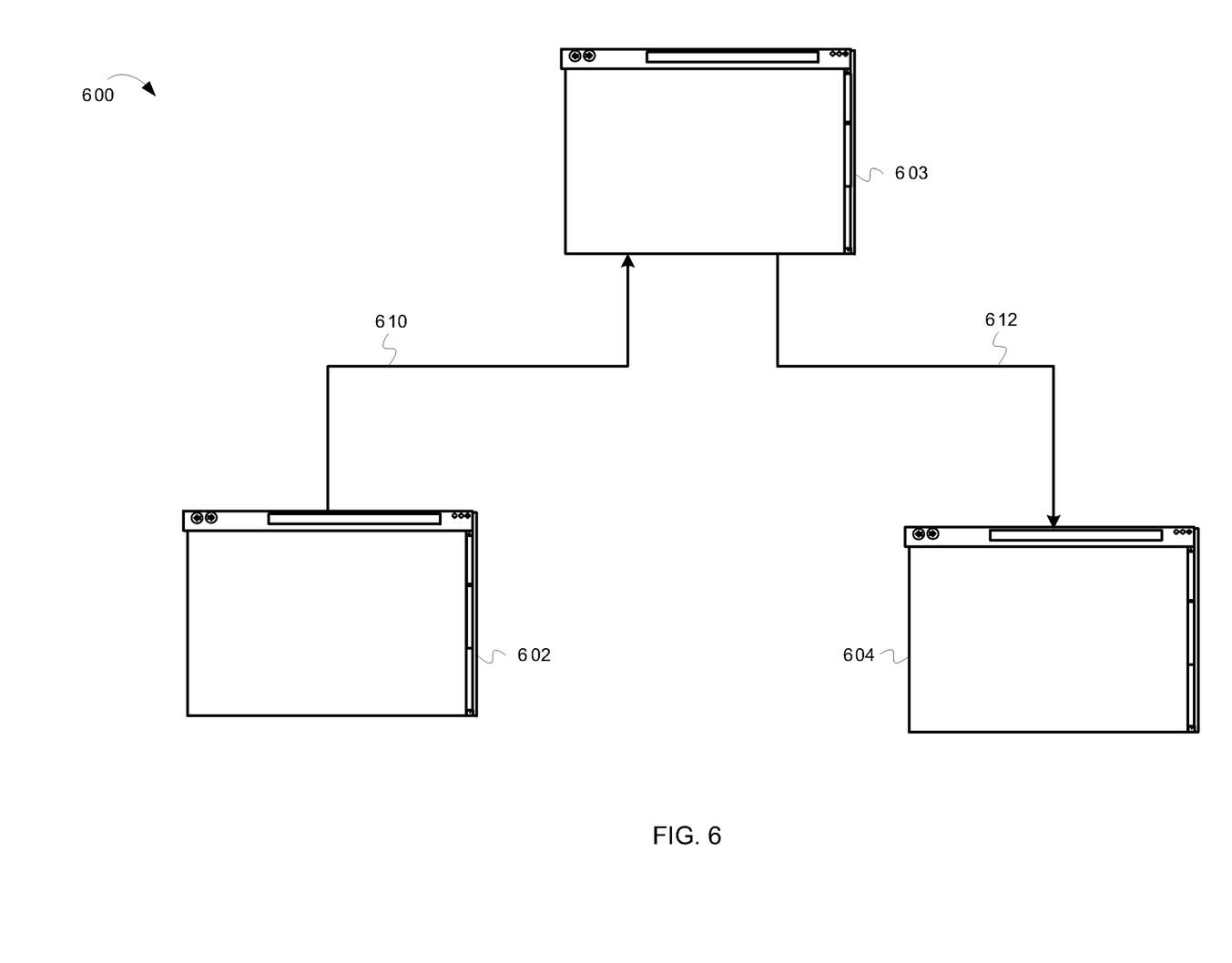
FIG. 6 depicts a spatially-oriented traversal child-parent-child tree-based animation, according to some example embodiments.

FIG. 6 depicts a spatially-oriented traversal child-parent-child tree-based animation, according to some example embodiments. In particular, FIG. 6 depicts an animation 600 that includes a current Internet web page 602, a parent Internet web page 603, and a destination Internet web page 604. The animation 600 shown in FIG. 6 can be the final part of the animation. For example, the animation 600 can commence with just showing the current Internet web page 602, followed by an animation of the drawing of a line 610 toward to the parent Internet web page 603, followed by an animation of the showing of the parent Internet web page 603, followed by an animation of the drawing of a line 612 toward to the destination Internet web page 604, and followed by an animation of the showing of the destination Internet web page 604.

Figure 7:
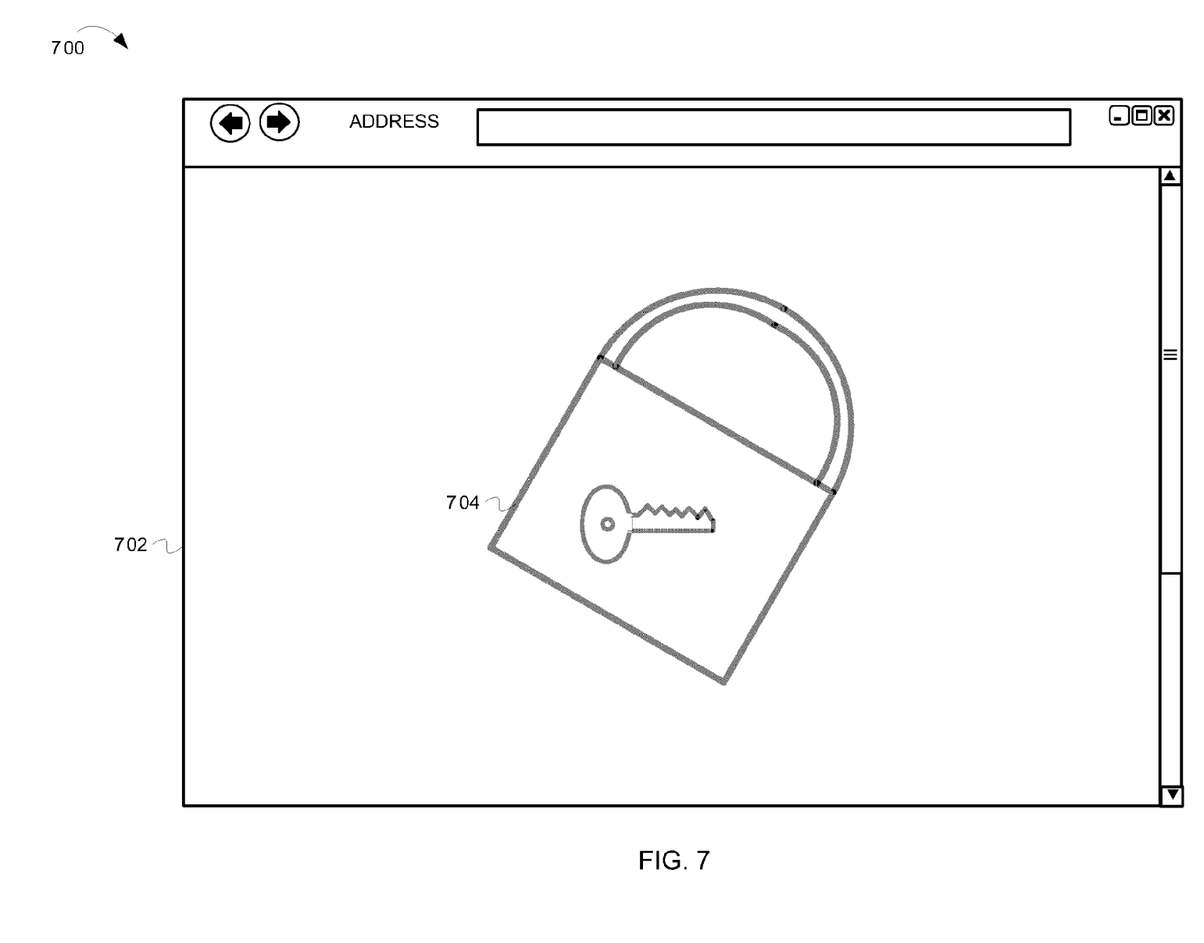
FIG. 7 depicts a spatially-oriented traversal animation that provides a denotation on the destination web page about a characteristic of the destination web page, according to some example embodiments.

FIG. 7 depicts a spatially-oriented traversal animation that provides a denotation on the destination web page about a characteristic of the destination web page, according to some example embodiments. In particular, FIG. 7 depicts an animation 700 that includes a destination Internet web page 702 that includes a semitransparent overlay of a symbol 704. In this example, the symbol 704 is an image of a lock. The image of a lock can be shown if the destination web page 702 is a secure web site. In another example, the image can be a bank, if the destination web page 702 is a banking web site.

Figure 8:
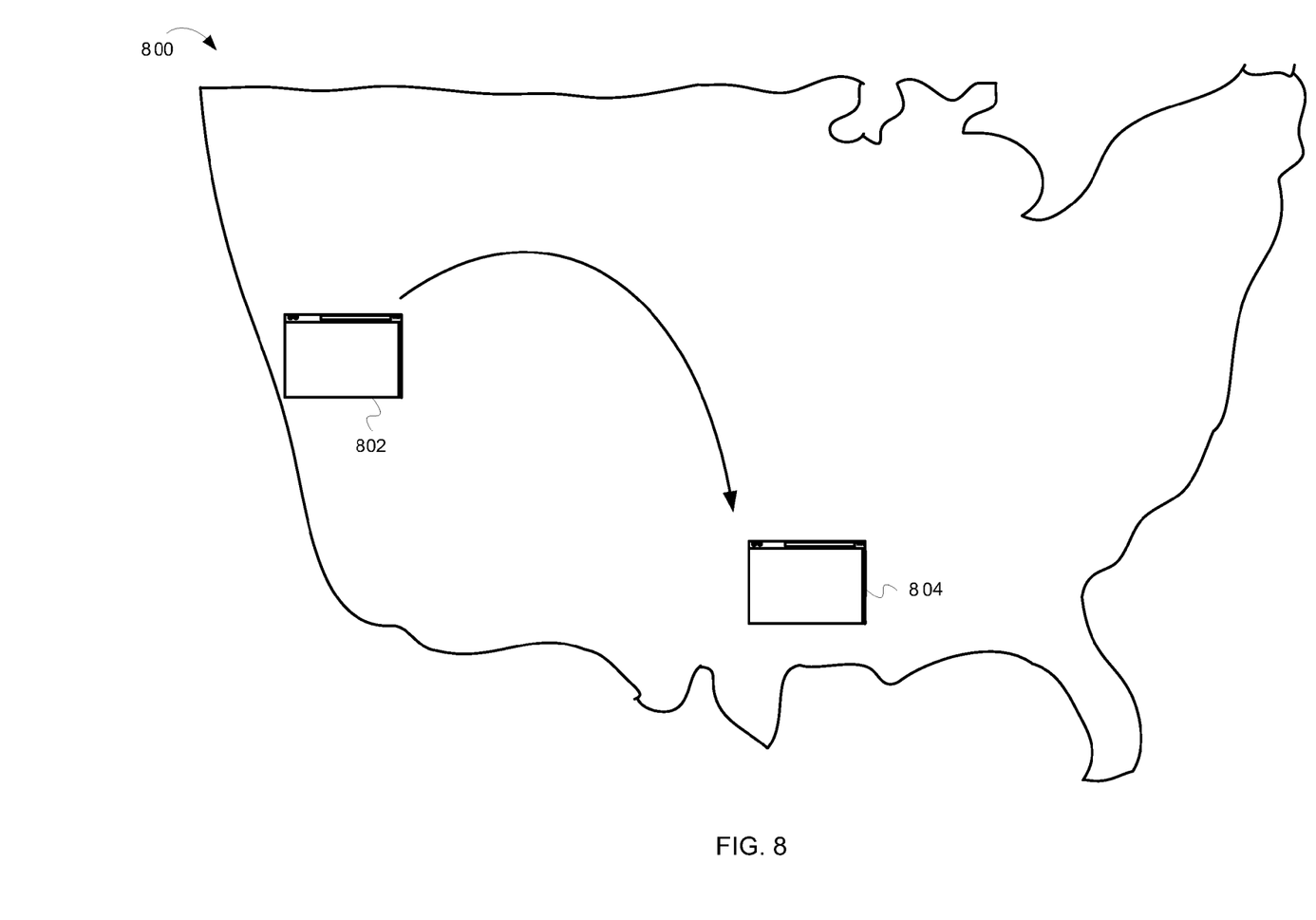
FIG. 8 depicts a spatially-oriented traversal animation that includes a geographic map, according to some example embodiments.

FIG. 8 depicts a spatially-oriented traversal animation that includes a geographic map, according to some example embodiments. In particular, FIG. 8 depicts an animation 800 that includes a geographic map of the United States that shows the location of a current Internet web page 802 and the location of a destination Internet web page 804. The animation can show the current Internet web page 802 and the destination Internet web page 804 and the arrow showing that the web pages are changing from the current Internet web page 802 and the destination Internet web page 804. The geographic map can include the world, a country, a region, etc. that shows the location of the current Internet web page and the destination Internet web page. To illustrate, the locations of the web pages can be based on their associated Internet Protocol address locations, domain name registration locations, extension of the domain for the web page (e.g., .us, .co, .uk, etc.), etc.

There are other types of animations (not shown in FIGS. 3-8) that can be incorporated into some example embodiments. For example, an animation can include a swiping (e.g., laterally, vertically, etc.) to show movement between the current Internet web page and the destination Internet web page. In another example, an animation can be customized to a specific web site or domain. For example, after a user inputs a search into a search engine web site, the animation can include a zoom in animation into the corporate logo for this search engine (e.g., Google®, Yahoo®, etc.). Also, additional animation can be added for forwards, mirrors, etc. when presenting a destination Internet web page. For example, assume a user selects a downlink link on the current Internet web page and that in response assume that the current Internet web page forwards the user to a different web site than the one that the user selected. In this example, the underlying animation can remain the same (e.g., zoom in animation), but a different colored arrow can be included in the animation to represent that the user is not going to the specific web site that the user selected. Also, these different animations can be combined depending on the movements to arrive at the destination Internet web page from the current Internet web page. For example, a zoom in, zoom out animation can be combined with an animation of a geographic map.

The web browser application 130 can determine which spatially-oriented traversal animation to use based on the relationship between the destination Internet address and the current Internet address. For example, if the relationship between the destination Internet address and the current Internet address is a drill down change, the spatially-oriented traversal animation can be a zoom in animation. In another example, if the relationship between the destination Internet address and the current Internet address is a back out change, the spatially-oriented traversal animation can be a zoom out animation. In another example, if the relationship between the destination Internet address and the current Internet address is intra-domain at a same level, the spatially-oriented traversal animation can be an animation of a tree-based movement to a child of a same parent. In another example, if the relationship between the destination Internet address and the current Internet address is inter-domain, the spatially-oriented traversal animation can be an animation of zoom out, move, zoom in (e.g., this animation can include also include a geographic map). In another example, if the relationship between the destination Internet address and the current Internet address is such that the destination Internet web page is a known search engine, the spatially-oriented traversal animation can be an animation of a map that includes a special spot that represents a directory, custom animation. In another example, if the relationship between the destination Internet address and the current Internet address is such that the destination Internet web page is a known web presence, the spatially-oriented traversal animation can be an animation of a map that includes a special spot that represents that presence, custom animation. In some example embodiments, a designer of either or both of the Internet web pages can provide recommendations or instructions on the type of animations to use based on the relationship between the destination Internet address and the current Internet address. Returning to the flowchart 200 of FIG. 2, the operations continue at block 208.

At block 208, the web browser application 130 animates bringing the destination web page onto the display using the selected spatially-oriented traversal animation. With reference to FIG. 1, the web browser application 130 can transmit the selected spatially-oriented traversal animation to the graphics processor 104. The graphics processor 104 can then replace the current Internet web page with a display of this selected spatially-oriented traversal animation in the window where the current Internet web page is being displayed. The operations of the flowchart 200 continue at block 210.

At block 210, the web browser application 130 displays the destination web page after the spatially-oriented traversal animation. With reference to FIG. 1, the web browser application 130 can transmit the destination Internet web page to the graphics processor 104. The graphics processor 104 can then replace the selected spatially-oriented traversal animation with the destination Internet web page. The operations of the flowchart 200 are complete.

As will be appreciated by one skilled in the art, aspects of the present inventive subject matter may be embodied as a system, method or computer program product. Accordingly, aspects of the present inventive subject matter may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present inventive subject matter may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present inventive subject matter may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present inventive subject matter are described with reference to flowchart illustrations and/or block diagrams of methods, apparatus (systems) and computer program products according to embodiments of the inventive subject matter. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

While the embodiments are described with reference to various implementations and exploitations, it will be understood that these embodiments are illustrative and that the scope of the inventive subject matter is not limited to them. In general, techniques for providing spatially-oriented traversal animations for network address transitions as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A method comprising:
   receiving a destination Internet address for a destination web page into a graphical web browser that is displaying a current web page having a current Internet address on a display;
   determining a relationship between the destination Internet address and the current Internet address, wherein determining the relationship comprises determining differences between the current Internet address and the destination Internet address;
   determining a spatially-oriented traversal animation based, at least in part, on the relationship between the destination Internet address and the current Internet address;
   animating bringing the destination web page onto the display using the spatially-oriented traversal animation; and
   displaying the destination web page after the spatially-oriented traversal animation.

2. The method of claim 1, wherein said determining the relationship between the destination Internet address and the current Internet address comprises one of determining that the destination web page comprises a drill-down resource relative to the current web page, determining that the destination Internet address comprises a reduced path in a domain in comparison to the current Internet address in the domain, determining that the destination Internet address is in a same domain and at a same level as the current Internet address, and determining that the destination Internet address is in a different domain relative to the current Internet address.

3. The method of claim 2, wherein the spatially-oriented traversal animation comprises a zoom-in animation if the destination web page comprises the drill-down resource relative to the current web page.

4. The method of claim 2, wherein the spatially-oriented traversal animation comprises a tree-based movement animation from a child to a parent to a different child in a tree if the destination Internet address is in the same domain and at the same level as the current Internet address.

5. The method of claim 2, wherein the spatially-oriented traversal animation comprises a zoom out, zoom in animation if the destination Internet address is in the different domain relative to the current Internet address.

6. The method of claim 5, wherein the spatially-oriented traversal animation comprises a geographic map, wherein the geographic map includes a geographic location of the current Internet address and a geographic location of the destination Internet address.

7. The method of claim 6, wherein the geographic location of the current Internet address is based on registration of a domain of a web site that includes the current web page, and wherein the geographic location of the destination Internet address is based on registration of a domain of a web site that includes the destination web page.

8. A computer program product for providing a spatially-oriented traversal animation for a network address transition, the computer program product comprising:

a non-transitory, computer readable storage medium having computer usable program code embodied therewith, the computer usable program code comprising a computer usable program code configured to:
  receive a destination Internet address for a destination web page into a graphical web browser that is displaying a current web page having a current Internet address on a display;
  determine a relationship between the destination Internet address and the current Internet address, wherein determining the relationship comprises determining differences between the current Internet address and the destination Internet address;
  determine the spatially-oriented traversal animation based, at least in part, on the relationship between the destination Internet address and the current Internet address;
  animate bringing the destination web page onto the display using the spatially-oriented traversal animation; and
  display the destination web page after the spatially-oriented traversal animation.

9. The non-transitory, computer readable storage medium of claim 8, wherein the computer usable program code configured to determine the relationship between the destination Internet address and the current Internet address comprises computer usable program code configured to determine that the destination web page comprises a drill-down resource relative to the current web page, that the destination Internet address comprises a reduced path in a domain in comparison to the current Internet address in the domain, that the destination Internet address is in a same domain and at a same level as the current Internet address, or that the destination Internet address is in a different domain relative to the current Internet address.

10. The non-transitory, computer readable storage medium of claim 9, wherein the spatially-oriented traversal animation comprises a zoom-in animation if the destination web page comprises the drill-down resource relative to the current web page.

11. The non-transitory, computer readable storage medium of claim 9, wherein the spatially-oriented traversal animation comprises a tree-based movement animation from a child to a parent to a different child in a tree if the destination Internet address is in the same domain and at the same level as the current Internet address.

12. The non-transitory, computer readable storage medium of claim 9, wherein the spatially-oriented traversal animation comprises a zoom out, zoom in animation if the destination Internet address is in the different domain relative to the current Internet address.

13. The non-transitory, computer readable storage medium of claim 12, wherein the spatially-oriented traversal animation comprises a geographic map, wherein the geographic map includes a geographic location of the current Internet address and a geographic location of the destination Internet address.

14. The non-transitory, computer readable storage medium of claim 13, wherein the geographic location of the current Internet address is based on registration of a domain of a web site that includes the current web page, and wherein the geographic location of the destination Internet address is based on registration of a domain of a web site that includes the destination web page.

15. An apparatus comprising:
  a processor; and
  a web browser application executable on the processor, the web browser application configured to:
    receive a destination Internet address for a destination web page into a graphical web browser that is displaying a current web page having a current Internet address on a display;
    determine a relationship between the destination Internet address and the current Internet address, wherein determining the relationship comprises determining differences between the current Internet address and the destination Internet address;
    determine a spatially-oriented traversal animation based, at least in part, on the relationship between the destination Internet address and the current Internet address;
    animate bringing the destination web page onto the display using the spatially-oriented traversal animation; and
    display the destination web page after the spatially-oriented traversal animation.

16. The apparatus of claim 15, wherein the web browser application configured to determine the relationship between the destination Internet address and the current Internet address comprises the web browser application being configured to determine that the destination web page comprises a drill-down resource relative to the current web page, that the destination Internet address comprises a reduced path in a domain in comparison to the current Internet address in the domain, that the destination Internet address is in a same domain and at a same level as the current Internet address, or that the destination Internet address is in a different domain relative to the current Internet address.

17. The apparatus of claim 16, wherein the spatially-oriented traversal animation comprises a tree-based movement animation from a child to a parent to a different child in a tree if the destination Internet address is in the same domain and at the same level as the current Internet address.

18. The apparatus of claim 16, wherein the spatially-oriented traversal animation comprises a zoom out, zoom in animation if the destination Internet address is in the different domain relative to the current Internet address.

19. The apparatus of claim 18, wherein the spatially-oriented traversal animation comprises a geographic map, wherein the geographic map includes a geographic location of the current Internet address and a geographic location of the destination Internet address.

20. The apparatus of claim 19, wherein the geographic location of the current Internet address is based on registration of a domain of a web site that includes the current web page, and wherein the geographic location of the destination Internet address is based on registration of a domain of a web site that includes the destination web page.

* * * * *